July 17, 1951     T. J. PAYANT     2,561,290
HEATING APPARATUS
Filed May 6, 1947     2 Sheets-Sheet 2
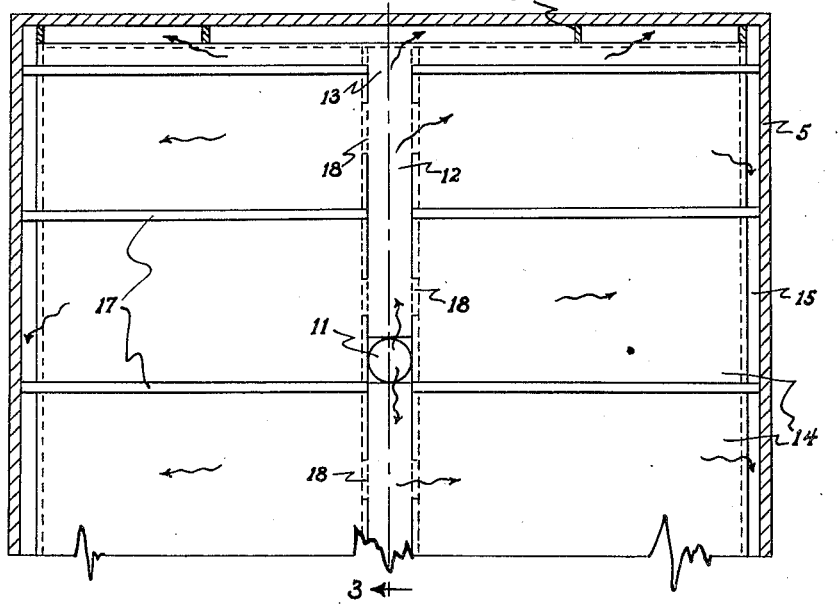
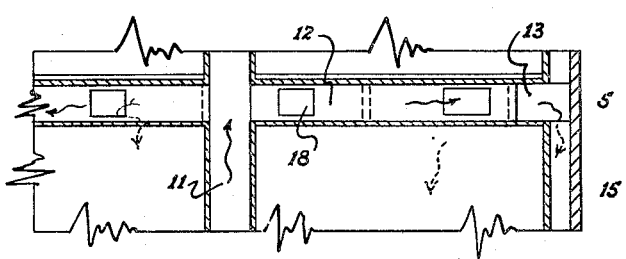
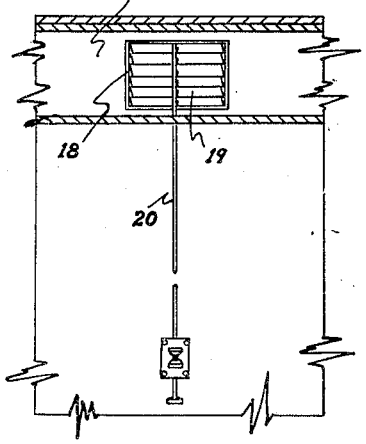
Inventor
THOMAS J. PAYANT Patented July 17, 1951

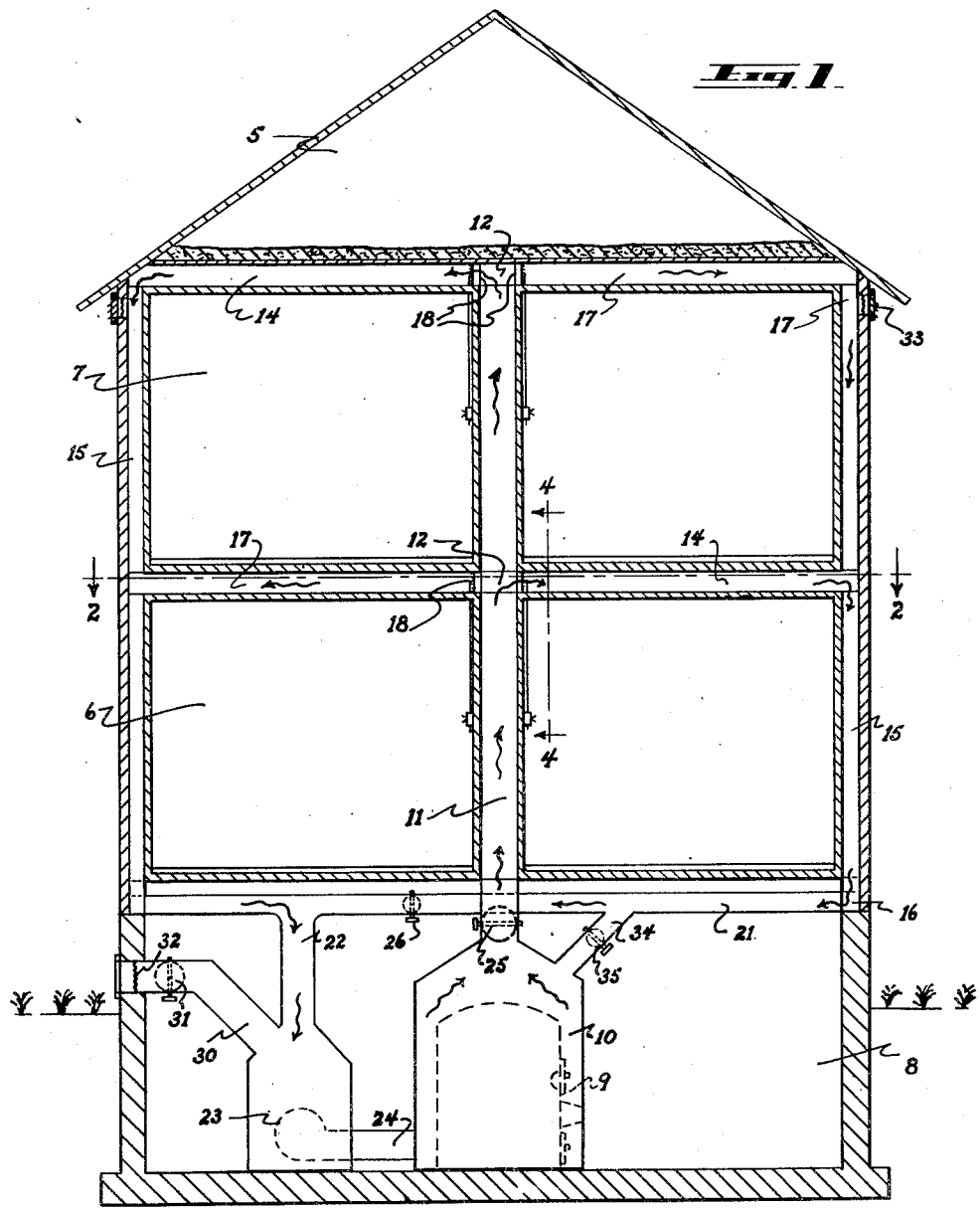

2,561,290

UNITED STATES PATENT OFFICE 2,561,290

HEATING APPARATUS

Thomas J. Payant, Eastview, Ontario, Canada

Application May 6, 1947, Serial No. 746,196

4 Claims. (Cl. 237—48)

This present invention relates to improvements in heating apparatus and appertains particularly to a heating and/or cooling system suitable for houses, apartments and like buildings.

An object of the invention is to provide a heating system of the "hot air" type wherein the body of heated air is caused to flow in a closed circuit in the space behind the walls and ceiling and so using the large areas of the walls and ceilings as radiating surfaces.

A further object of the invention is to provide a hot air heating system of this kind whereby the atmosphere in the rooms is separate and distinct from that heated and circulated, is not dried by excessive baking around the furnace, is free of contamination by fuel gases and soot and being used only for ventilation purposes may be changed as little or much as required without setting up drafts or deflecting the heated air flow; such fresh, cool air as is admitted to the rooms being quickly warmed by contact with the large expanse of radiation.

A further object of the invention is to provide a heating and/or cooling apparatus of novel construction whereby the same forced draft and distributing system serves as a closed circuit heating system for use in the winter and a cooling system in summer.

A further object of the invention is to provide a heating apparatus for buildings, by which either heated or cool air may be circulated through passageways enclosed in the walls and ceilings, that is simple, practical and efficient, can be constructed, installed and operated at a very substantial saving and because of the resultant elimination of dust, gas drafts and rapid fluctuations of temperature will prove more healthy than the conventional "hot air" system in use today that circulates dry, furnace-baked air.

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure wherein like characters indicate like parts throughout the several views.

In the drawings:

Figure 1 is a vertical section diagram of a residential building incorporating this radiant system of temperature control;

Figure 2 is a horizontal section as taken on line 2—2 of this diagram;

Figure 3 is a vertical, longitudinal section along the line 3—3 of Figure 2; and Figure 4 is an enlarged elevational detail of a manually operated gate or valve for controlling the flow of air from a main horizontal longitudinal duct over a ceiling area.

In these illustrations, the invention is shown embodied in a residential type building 5 consisting of two floors 6 and 7 and a basement 8 partly below ground level. Relatively centrally located in the basement is the heating unit 9, such as a coal or oil burning furnace and surrounding it is an air heating jacket or chamber 10. A main vertical hot air stack 11 rises from the top centre of the chamber 10 to a point above the ceiling of the second or upper floor 7.

Just above ceiling level of both floors 6 and 7, horizontal, longitudinally extending distributing ducts 12, each opening off both opposite sides of the main stack 11, run the length of the building 5, where remote ends 13 are open and terminate a little short of the end walls. Transverse, horizontal area passageways 14, on each side of the longitudinal duct 12, extend outwards to the opposite side walls of the building 5 and communicate there with corresponding vertical area passageways 15 that unite in longitudinal manifolds 16 in the basement. Vertical partitions 17 such as beams, stringers, joists or the like divide the horizontal and vertical passageways which blanket the entire ceiling and outer wall areas of the rooms.

The outlets 18 from the distributing ducts 12 to the horizontal area passageways 14 may be graduated in size, being larger away from the stack 11, and are preferably valved as by the finned closure 19 shown in Figure 4 and regulated by the manually operated control rod 20.

A conduit 21 between the two longitudinal basement manifolds 16 connects by a stack 22 with a motor driven fan unit 23 and passes the air thus drawn down the vertical wall passage 15 and through the manifolds 16 back to the base of the heating chamber 10 by a pipe 24. A main damper 25, normally open, is inserted near the base of the stack 11 and a secondary damper 26 is inserted in the length of the conduit 21 to equalize the volume of return on opposite sides of the building.

To switch over from heating to cooling, a refrigerating unit is merely substituted for the furnace 9 or placed along side the furnace and the flow of air rerouted therethrough and the same closed circuit of air utilized. A simpler form of cooling is shown where a fresh air intake 30, with damper 31 and screen 32, leads into the fan unit housing 23 from the north side of the building, just above ground level. The cool moist air from the shaded side of the building is drawn in by the fan and distributed through the system including the chamber 10, stack 11, longitudinal distributing ducts 12 and over the ceilings by the area passageways 14 and thence preferably out by valved, louvered discharge openings 33 set under the eaves.

A cut-out or by-pass connection 34 is provided between the air jacket 10 and the conduit 21, with a damper 35 that is normally closed but may be opened and main stack damper 25 closed to completely reroute the flow, especially when a closed circulation is used when heating or cooling.

The regulation of the dampers is indicated as manual, as is the valves 18 but obviously these as well as the louvered discharge openings 33 and the operation of the fan 23 and the heating and/or cooling unit 9 may be automatic as by well known types of thermostats. Similarly, it will be apparent that in larger buildings two or more separate return flow fans may be employed to equalize the circulation of the heated air or to direct it as found best suited to the particular needs of the building.

From the foregoing description taken in connection with the accompanying drawings, it will be manifest that a heating apparatus is provided that will fulfill all the necessary requirements of such a device but as many changes could be made in the above description and many apparently widely different embodiments of the invention may be constructed within the scope of the appended claims without departing from the spirit or scope thereof, it is intended that all matters contained in the said accompanying specification and drawings shall be interpreted as illustrative and not in a limitative or restrictive sense.

Having thus described the invention, what I claim as new and desire to secure by Letters Patent is:

1. A hot air radiant heating apparatus comprising in combination with a building, a furnace, a hot air jacket surrounding the same, a stack rising centrally through said building from the top center of said jacket, oppositely extending longitudinal, horizontal distributing ducts above the ceiling of the building opening off said stack, horizontal transverse area passageways running from said ducts and extending over the ceiling, vertical area passageways continuing therefrom in the walls, a manifold at the base of said vertical area passageways and communication from said manifold to the base of said hot air jacket.

2. A hot air radiant heating apparatus comprising in combination with a building, a furnace, a hot air jacket surrounding the same, a stack rising through the center of said building from the top center of said jacket, oppositely extending longitudinal horizontal distributing ducts above the ceiling of the building opening off said stack, horizontal transverse area passageways running from said ducts and extending over the ceiling valved openings between said ducts and passageways, vertical area passageways in the walls continuing from said first mentioned area passageways, a manifold at the base of said vertical area passageways and communication from said manifold to the base of said hot air jacket.

3. A hot air radiant heating apparatus comprising in combination with a building, a furnace located centrally in the basement of said building, a hot air jacket surrounding the same, a stack rising vertically up the center of said building from the top of said jacket, oppositely extending longitudinal, horizontal distributing ducts above the ceiling of the building opening off said stack, horizontal transverse area passageways extending over the ceiling, valved openings of graduated size between said ducts and passageways, manually operated regulators for said valved openings, vertical area passageways in the walls continuing from said first mentioned area passageways, a manifold at the base of said vertical area passageways and communication from said manifold to the base of said hot air jacket.

4. A hot air radiant heating apparatus comprising in combination with a building, a furnace, a hot air jacket surrounding the same, a stack from the top of said jacket, rising vertically up the center of the building, longitudinal, horizontal distributing ducts above the ceiling of the building opening off both opposite sides of said stack, horizontal transverse area passageways running laterally in both directions from said ducts and extending over the ceiling, vertical area passageways continuing therefrom in the walls, a manifold at the base of said vertical area passageways, a motor driven fan unit, a conduit from said manifold to said fan unit and a delivery pipe connecting said fan unit and the base of said hot air jacket.

THOMAS J. PAYANT.

REFERENCES CITED

The following references are of record in the file of this patent:

UNITED STATES PATENTS

| Number | Name | Date |
|---|---|---|
| 289,634 | Ernst | Dec. 4, 1883 |
| 1,168,304 | Hellstrom | Jan. 18, 1916 |
| 2,181,814 | Knapp | Nov. 28, 1939 |
| 2,210,960 | St. Pierre | Aug. 13, 1940 |
| 2,240,951 | Hamjy | May 6, 1941 |
| 2,346,220 | Johnson | Dec. 5, 1944 |
| 2,465,184 | Alderman | Mar. 22, 1949 |

FOREIGN PATENTS

| Number | Country | Date |
|---|---|---|
| 2,009 | Great Britain | July 27, 1914 |
| 457,265 | Great Britain | Nov. 24, 1936 |
| 475,229 | Great Britain | Nov. 16, 1937 |
| 634,837 | France | Dec. 9, 1927 |